(12) United States Patent
Nakamura et al.

(10) Patent No.: US 6,297,856 B1
(45) Date of Patent: *Oct. 2, 2001

(54) APPARATUS AND SYSTEM FOR READING DATA FROM A DYNAMIC IMAGE DATA FILE

(75) Inventors: Yasuo Nakamura, Yokohama; Hiroki Yonezawa, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/563,770

(22) Filed: Nov. 28, 1995

(30) Foreign Application Priority Data

Nov. 30, 1994 (JP) ...................................... 6-296141
Nov. 30, 1994 (JP) ...................................... 6-296678

(51) Int. Cl.⁷ .................................................. H04N 5/268
(52) U.S. Cl. .......................... 348/705; 348/564; 348/722; 348/15
(58) Field of Search ................................. 348/15, 7, 722, 348/705, 706, 569, 564, 588, 565; 395/162

(56) References Cited

U.S. PATENT DOCUMENTS

| 5,105,278 | * | 4/1992 | Erickson et al. | 348/705 |
| 5,181,114 | * | 1/1993 | Richards et al. | 348/722 |
| 5,264,929 | * | 11/1993 | Yamaguchi | 348/159 |
| 5,287,186 | * | 2/1994 | Takamori | 348/705 |
| 5,343,250 | * | 8/1994 | Iwamura | 348/564 |
| 5,355,450 | * | 10/1994 | Garmon et al. | 395/162 |
| 5,406,322 | * | 4/1995 | Port et al. | 348/25 |
| 5,440,491 | * | 8/1995 | Shibata et al. | 348/15 |
| 5,450,139 | * | 9/1995 | Haraguchi et al. | 348/705 |
| 5,450,140 | * | 9/1995 | Washino | 348/722 |
| 5,453,780 | * | 9/1995 | Chen et al. | 348/15 |
| 5,541,639 | * | 7/1996 | Takatsuki et al. | 348/15 |
| 5,598,208 | * | 1/1997 | McClintock | 348/159 |

FOREIGN PATENT DOCUMENTS

| 0572257 | 12/1993 | (EP) . |
| WO9221211 | 11/1992 | (WO) . |

OTHER PUBLICATIONS

Rangan, et al., "Software Architecture For Integration Of Video Services In The Etherphone System", IEEE Journal on Selected Areas in Communications, No. 9, pp. 1395–1404 (12/91).

Harvey, et al., "Videoconferencing Systems: Seeing Is Believing", AT&T Technology, No. 3, pp. 7–11, (Fall, 1992).

Tanigawa, et al., "Personal Multimedia–Multipoint Teleconference System", NIT Laboratories, Japan, pp. 1127–1134.

* cited by examiner

Primary Examiner—Victor R. Kostak
(74) Attorney, Agent, or Firm—Fitzpatrick, Cella, Harper & Scinto

(57) ABSTRACT

A video communication system provided with a plurality of video communication devices connected to a network includes a circuit for selecting and displaying video data received from the above-described video communication devices and video data received from a video storage apparatus. The video storage apparatus includes a video data storage device and a means for transmitting required video data to the video communication device in case a request for reading is made from the video communication device.

8 Claims, 18 Drawing Sheets

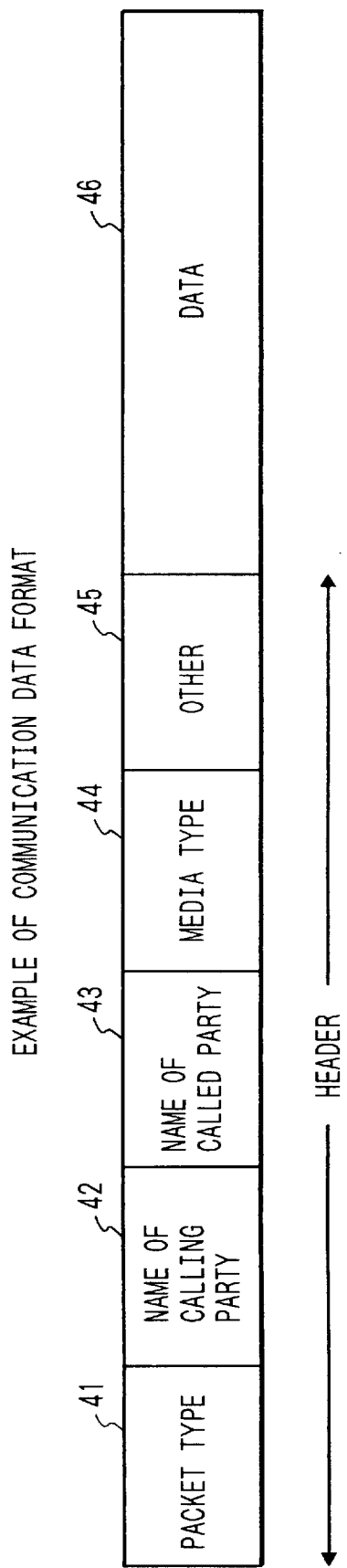

APPARATUS AND SYSTEM FOR READING DATA FROM A DYNAMIC IMAGE DATA FILE

BACKGROUND OF THE INVENTION

1. Field of the Invention

The present invention relates to an image processing apparatus, a communication device and system thereof, and particularly to a video communication device for displaying image data and a system incorporating such a device.

2. Related Background Art

If digital video data is reproduced as a dynamic image by a computer, in the prior art a digital video data file is successively read and displayed on the screen of a monitor after a file is decompressed in case it is compressed. Therefore, normally only one image at a time in a video data file can be seen. According to the prior art, video data consisting of different files cannot be reproduced and displayed continuously.

For instance, if the past video data stored in a video server is desired to be read when the current image provided by a video camera connected to a computer in a network is communicated to another computer via the network and is recorded in the video server in the network as a file divided every given period of time, repetitive work in which another file is read after reading a file is completed is required.

To know how an image changes after a given time elapses when a reproduced image is seen, an operation for reading, reproducing and displaying another file is required if the image exists in another file, and manual setting of time is required even if the image exists in the same file.

Furthermore, in a video conference system and a supervisory control system for monitoring a remote site, an image provided by a video camera is transmitted and displayed via a network.

In the meantime, a system exists in which an image provided by a video camera is digitized, compressed according to an image coding scheme such as Moving Picture Experts Group (MPEG) and Joint Photographic Coding Experts Group (Motion JPEG) if necessary, and stored in an image database.

However, if the past image of the current one provided by a camera is retrieved because a system for transmitting and displaying a remote image and a system retrieving and displaying an image stored in an image database are separate, both systems must be activated individually.

Also, as both systems are separate, an image cannot be retrieved and displayed continuously from the past to the present and the operations are also inconsistent.

SUMMARY OF THE INVENTION

The object of the present invention is to provide an image processing apparatus, a video communication device and a system thereof wherein all or each of the above-described problems are/is solved.

Another object of the present invention is to provide an image processing process which enables reading video data stored in a video storage apparatus with complete control, a video communication device and a system thereof.

Another object of the present invention is to provide an image processing process which enables reading video data stored in a video storage apparatus via a communication line with complete control, a video communication device and a system thereof.

With a view to accomplishing such objects, an image processing apparatus provided with first means for supplying an input image to first display means to achieve real-time display and second means for supplying a prior image (prior by a predetermined time to the input image) to second display means to achieve real-time display, is disclosed according to a preferred embodiment of the present invention.

Further, another object of the present invention is to provide an image processing apparatus, a communication device or a system thereof provided with a new function.

Other objects and characteristics of the present invention will be disclosed by description of embodiments and the drawings described below.

BRIEF DESCRIPTION OF THE DRAWINGS

FIG. 18 shows an example of a communication data format according to a second embodiment of the present invention.

DESCRIPTION OF THE PREFERRED EMBODIMENTS

Figure 1:
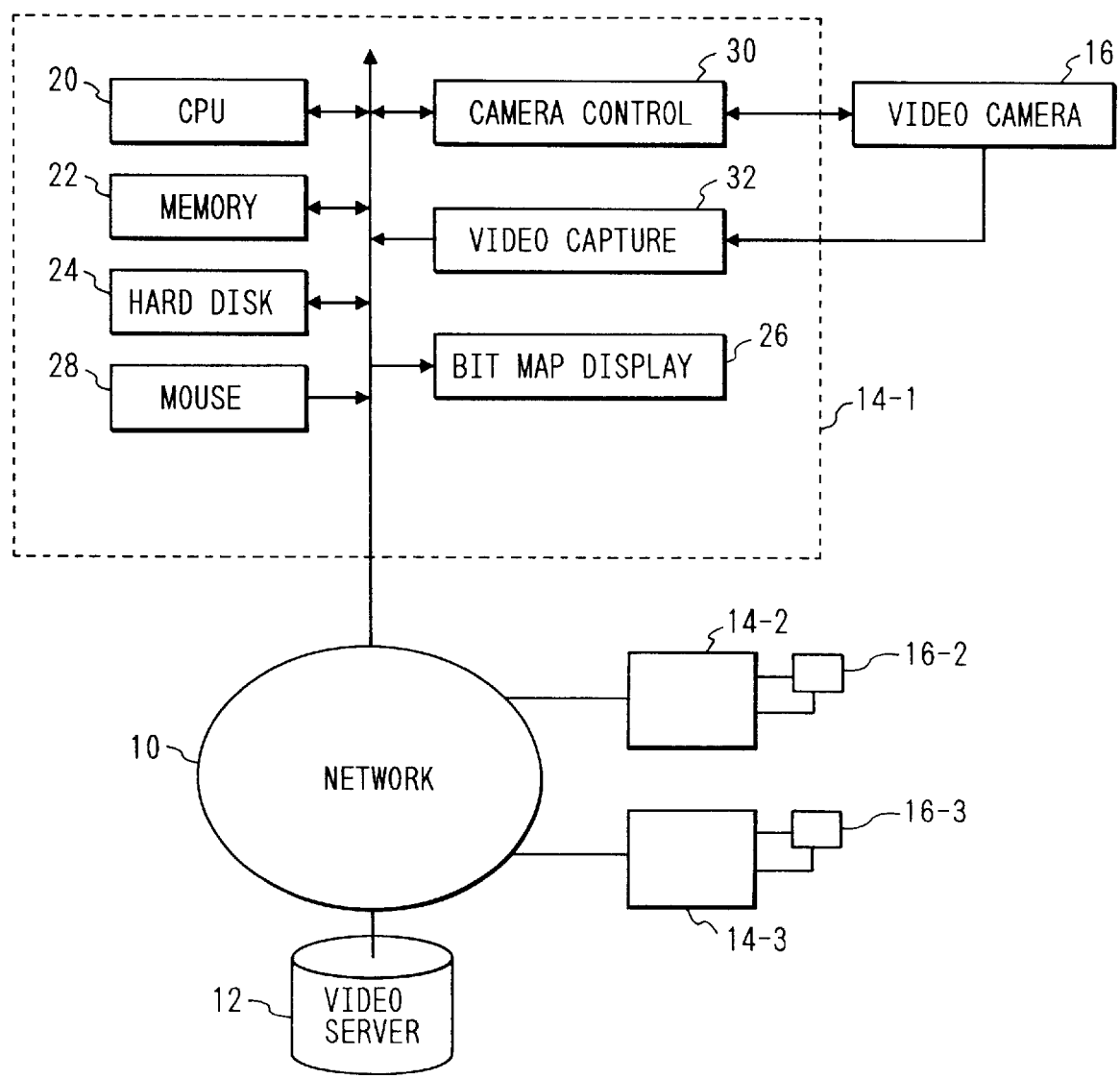
FIG. 1 is a schematic block diagram according to an embodiment of the present invention.

Referring to the drawings, preferred embodiments according to the present invention will be described in detail below.

<First Embodiment>

FIG. 1 is a schematic block diagram showing an embodiment according to the present invention. A video server 12 and a plurality of computers 14-1, 14-2 and 14-3 are connected to a network 10 and video cameras 16-1 to 16-3 as image input means are connected to each computer 14-1 to 14-3. Each computer 14-1 to 14-3 is basically constituted similarly and is provided with CPU 20 for controlling the entire computer, memory 22 which is the main storage of CPU 20, a hard disk 24 as a secondary memory, a bit map display 26, a mouse 28 as a pointing device, a camera control circuit 30 for controlling a pan, a tilt, zooming in and out and a focus of the connected video cameras 16 and a video capture circuit 32 for fetching video output from the connected video cameras 14 in the corresponding computers 14.

This embodiment is provided with the current mode in which video output from a video camera 16 connected directly to a computer or to the other computer is reproduced and displayed at a real time and the past mode in which a video data file stored in a video server 12 is reproduced and displayed. A video server according to this embodiment is constituted by a well-known system called Redundant Array of Inexpensive Disc (RAID) and enables concurrent writing and reading of dynamic image data.

Figure 2:
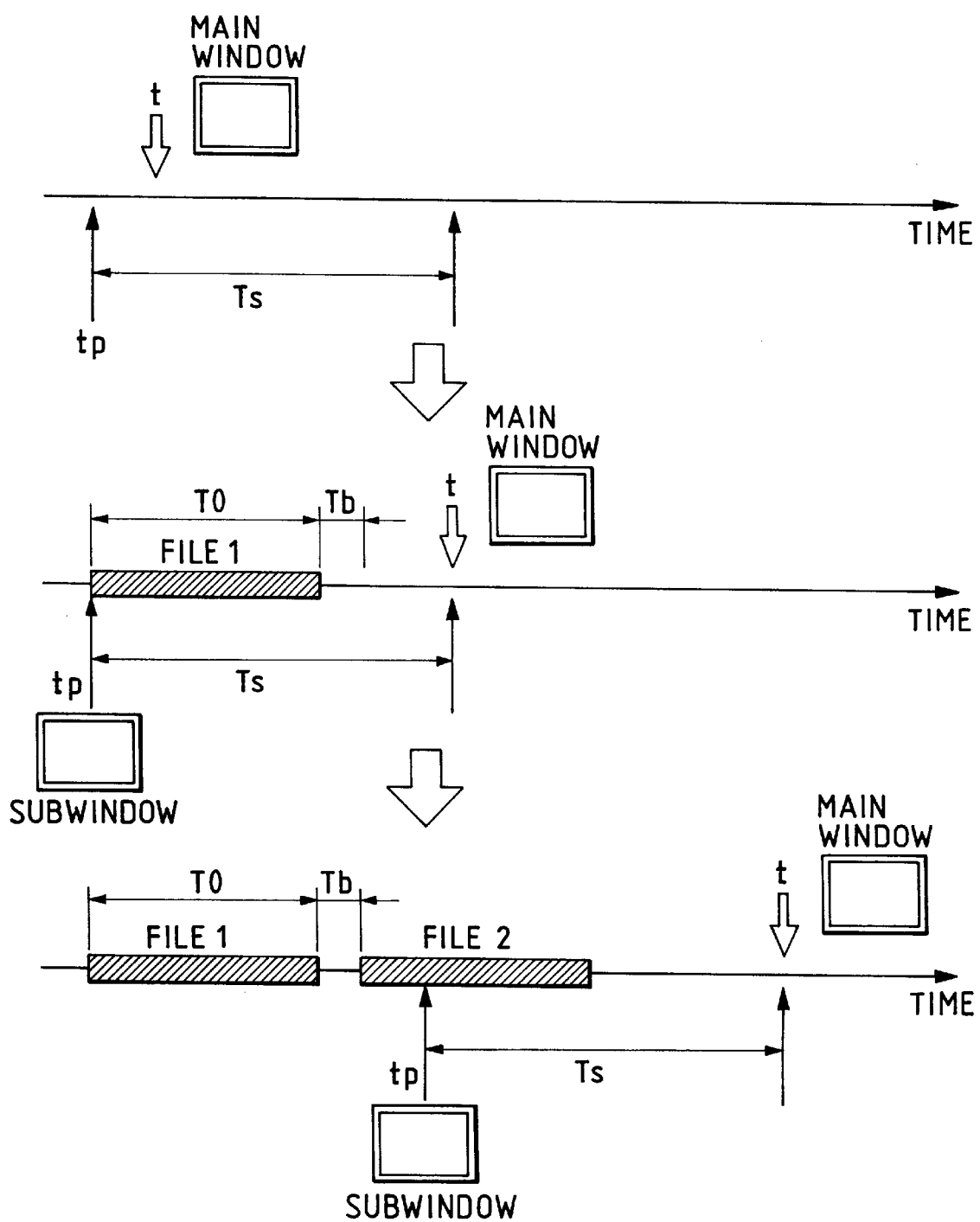
FIG. 2 shows access to a file in the current mode.
Figure 3:
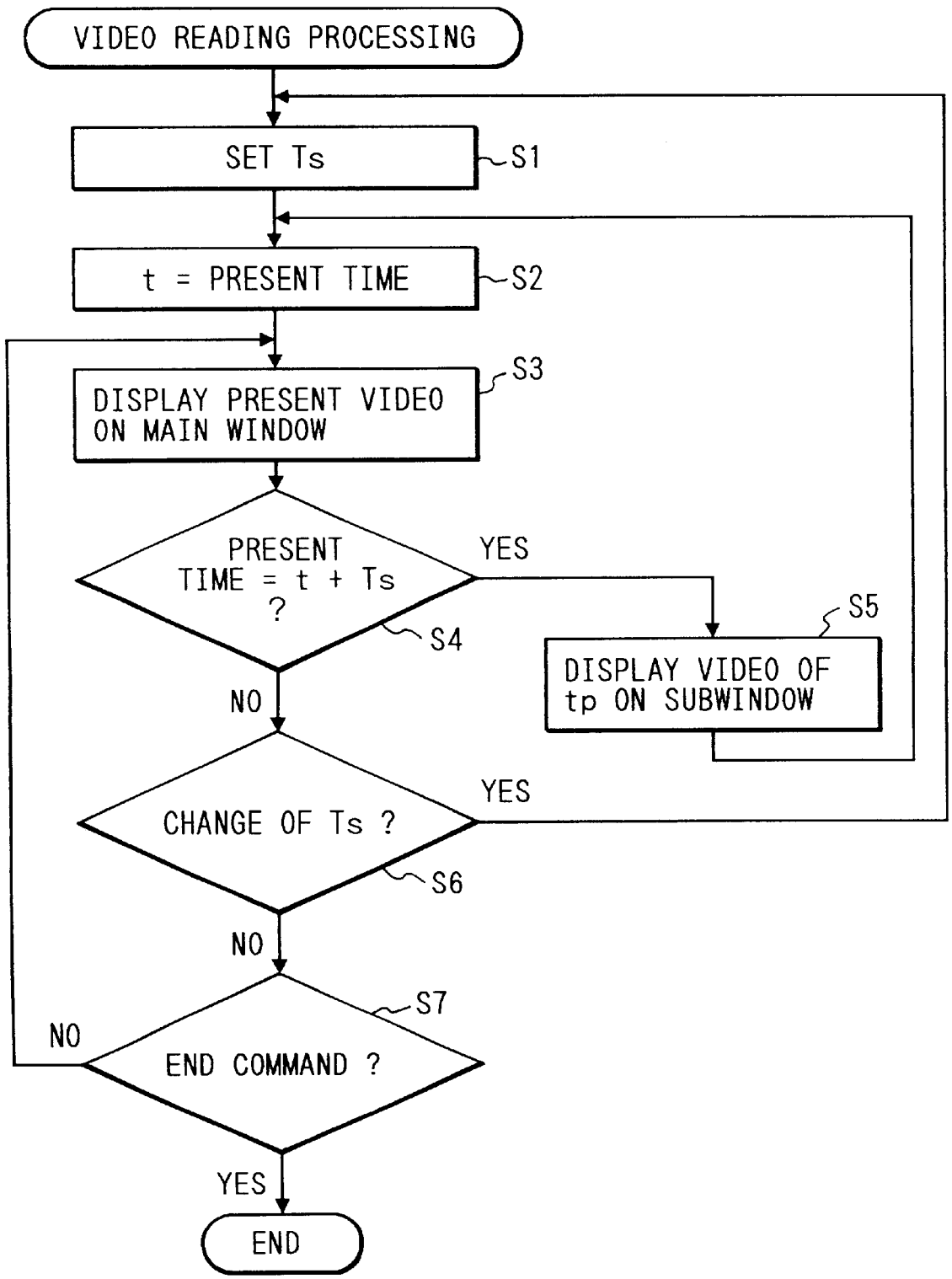
FIG. 3 is a flowchart of displaying video data in the current mode.

First, the current mode will be described below. FIG. 2 shows access to a file in the current mode and FIG. 3 shows a flowchart of operation in the current mode.

Referring to FIG. 2, files 1, 2, etc. are a series of files consisting of digital video data provided by the same one video camera 16 and divided every given time T0 and numbers are allocated to them in the order of generation. Tb shows time in which video data is not read for processing for dividing into files. It is naturally preferable that Tb is as short as possible and Tb can be substantially removed by securing sufficient capacity of a buffer. "t" shows the current time, tp shows the time of the past video (frame) displayed together with the current video (frame) and Ts shows the difference of time between the current and past video concurrently displayed. "tp" is equal to a value obtained by subtracting Ts from "t". In this embodiment, a value obtained by adding T0 and Tb is set to a smaller value than Ts. That is, the past video concurrently displayed is stored in a file prior by one or more depending upon the ratio of Ts to T0.

When the current mode is activated for instance by operating a mouse shown in FIG. 1, Ts is first set (S1) and current time data is set to a variable t showing the current time (S2). An activated video browser starts displaying an image provided by a specified video camera 16 in the main window of a bit map display 26 and continues to display an image in the main window at a real time until termination is specified (S3, S7).

When time specified for Ts elapses (S4) since displaying a video signal provided by a video camera 16 in the main window is started, displaying a frame at the time tp prior by Ts to the current time t in a subwindow is started (S5), a variable t is updated (S2) and elapse by Ts is again awaited. As it is warranted that a frame at the time tp is recorded as a file without fail according to a condition, "T0+Tb<TS", the frame may be read from the file. However, exceptionally, the time tp may be just in the range of Tb and in this case, a frame at the nearest time prior to the time tp of the files in which video is recorded may be selected.

If Ts must be changed on the way (S6), operation is restarted from S1 at that time.

As described above, as the current video and the video prior by time defined as Ts are concurrently displayed according to the current mode in this embodiment as shown in FIG. 3, change of time can be readily checked and when the current video is to be taken notice of, it can be checked by checking the past video in detail. Such a function is very useful for a variety of monitoring camera systems.

Figure 4:
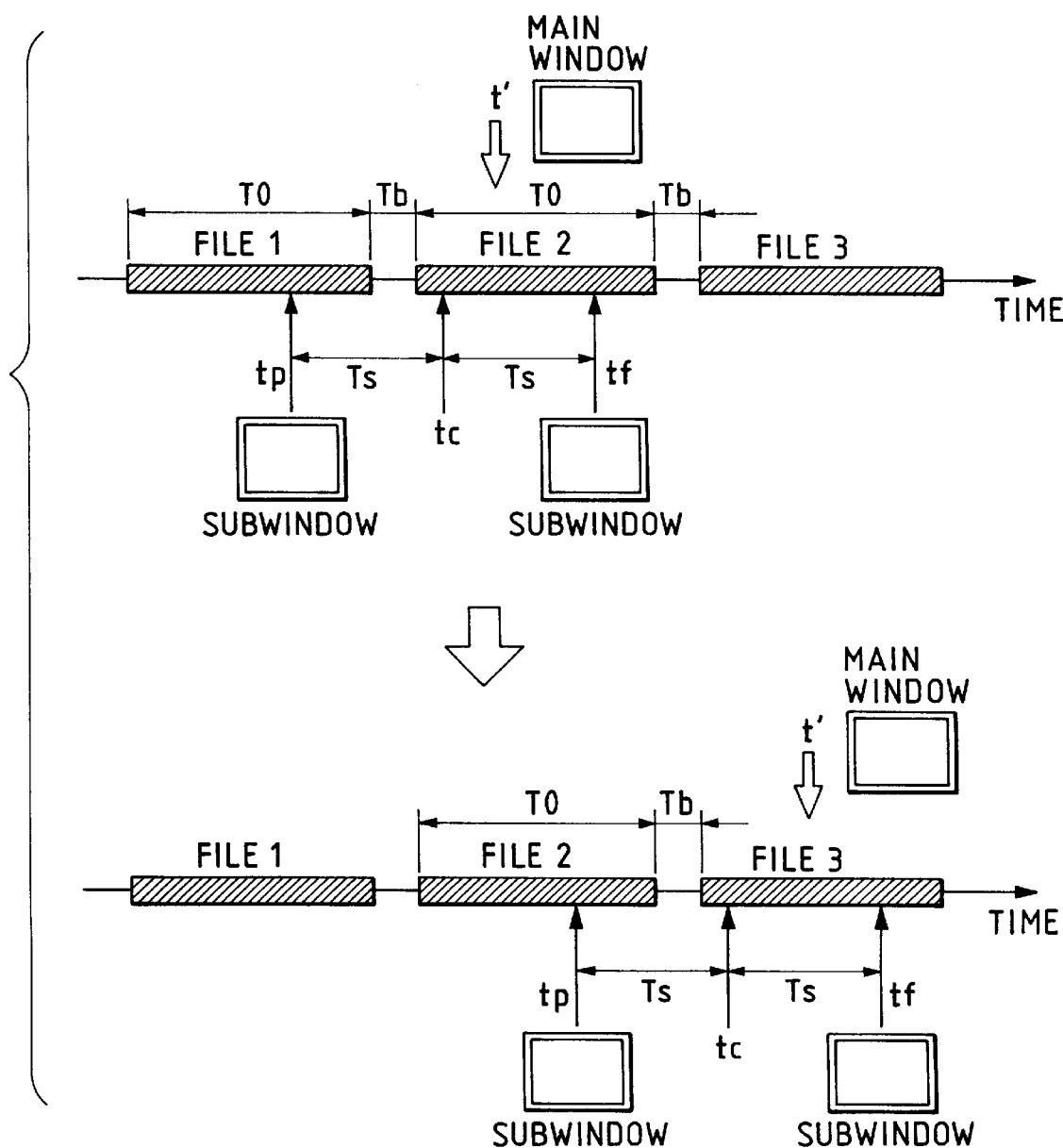
FIG. 4 shows access to a file in the past mode.
Figure 5:
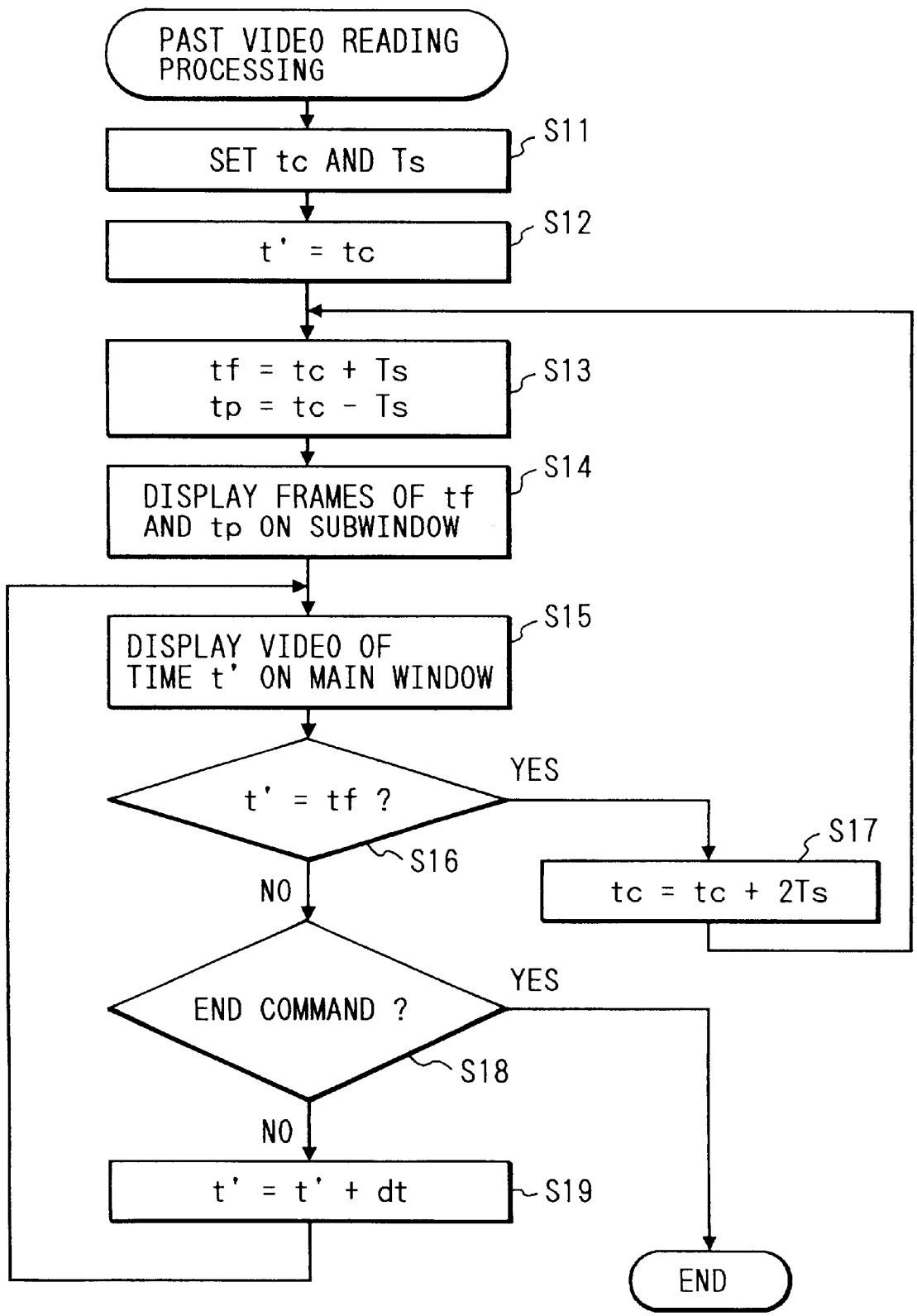
FIG. 5 is a flowchart of displaying video data in the past mode.

Next, the past mode will be described. In the past mode, the main reproduced video is displayed in the main window and the past and future images of which difference in time is equivalent to 2Ts with the main reproduced video in the middle of the time 2Ts are displayed in an individual subwindow as a static image. The past and future static images are respectively updated to such images after 2Ts elapses at the appropriate timing. FIG. 4 shows access in the past mode and FIG. 5 shows a flowchart in the past mode.

Referring to FIG. 4, "t'" shows the time in which a frame is displayed in the main window or a frame pointer and it is equivalent to the center in time between the past and future images displayed in the subwindow or a frame pointer. "tp" shows the time prior by Ts to tc or a frame pointer and "tf" shows the time later by Ts than tc or a frame pointer. That is, tc=tp+Ts=tf−Ts. "tc" shows the time for reproduction to be started and determined by a viewer.

If video is displayed in the past mode, a viewer first sets the time tc of a frame of which reproduction is to be started and Ts which defines images prior and later how in time with tc in the center are displayed in a subwindow (S11). "tc" is set to "t'" (S12). "tp" and "tf" are calculated based upon tc and Ts (S13). The frames at the time tp and at the time tf are read of a series of video files and are displayed in respective subwindows (S14).

Next, a frame at the time t' of which initial value is tc is fetched of a series of video files similarly and is displayed in the main window (S15). Each frame is serially reproduced and displayed (S15) adding the time dt between frames to the time t' (S19) until an instruction for termination is input (S18).

If the time t' is equal to tf in the meanwhile (S16), it is added by 2Ts to tc (S17), tp and tf of the new tc are again calculated (S13) and images to be displayed in subwindows are updated (S14).

Though action in case Ts is changed on the way of reproduction is omitted in FIG. 5, in that case operation may be restarted from a step S11.

As described above, the past dynamic image between tp and tf based upon tc and Ts arbitrarily set can be displayed in the main window and the frames at the time tp and at the time tf can be displayed in a respective subwindow. As not a dynamic image but a static image is displayed in a subwindow, only one circuit for reproducing a dynamic image for the main window is required and a dynamic image can be provided at a low cost. As a static image displayed in a subwindow is updated every 2Ts, it can be also considered a so-called low-speed dynamic image and a system efficient for the cost can be provided.

In this embodiment, tc and Ts may be input to CPU 20 using an input device such as a mouse shown in FIG. 1.

Figure 6:
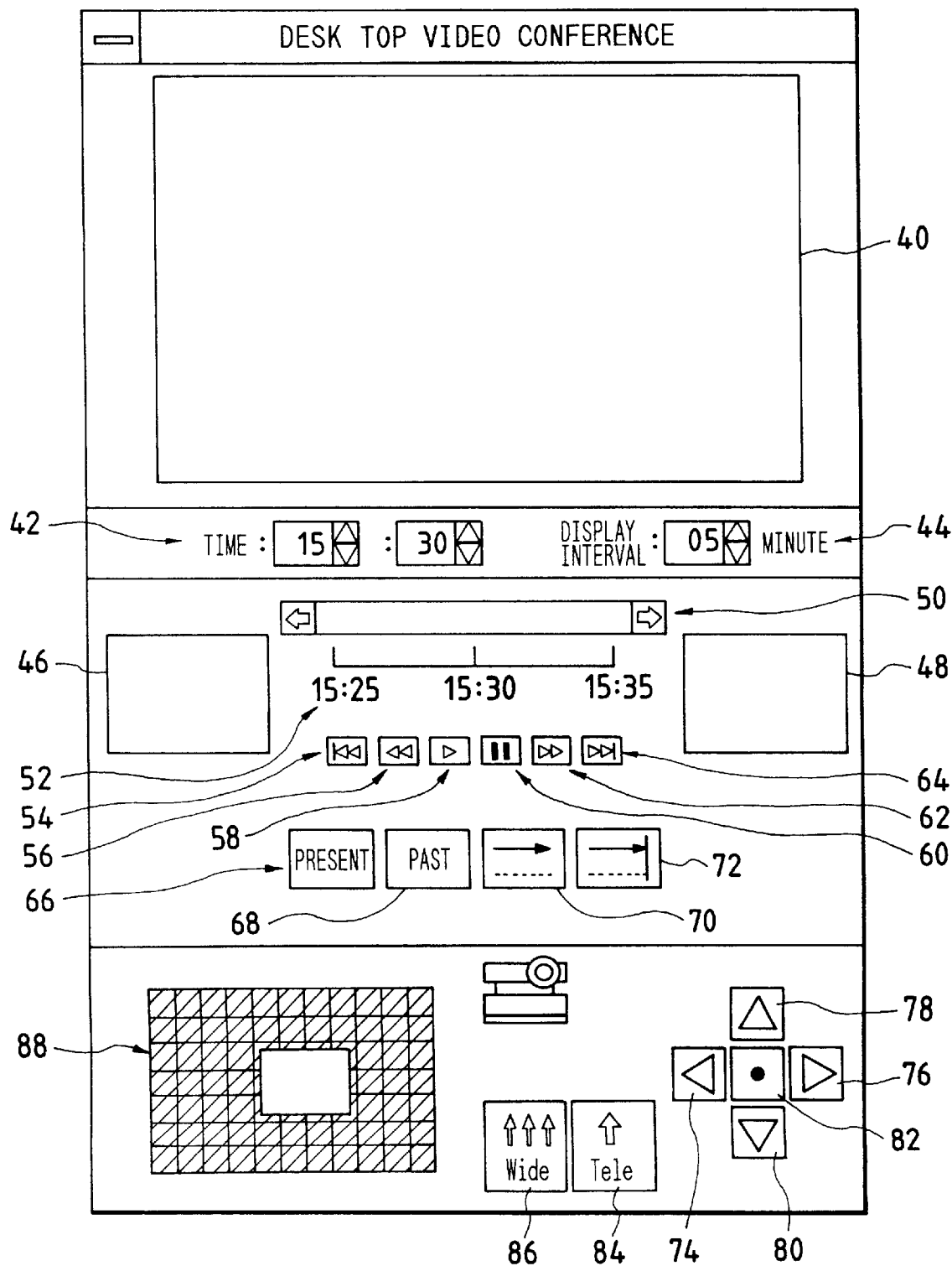
FIG. 6 shows a graphical user interface in the current mode.
Figure 7:
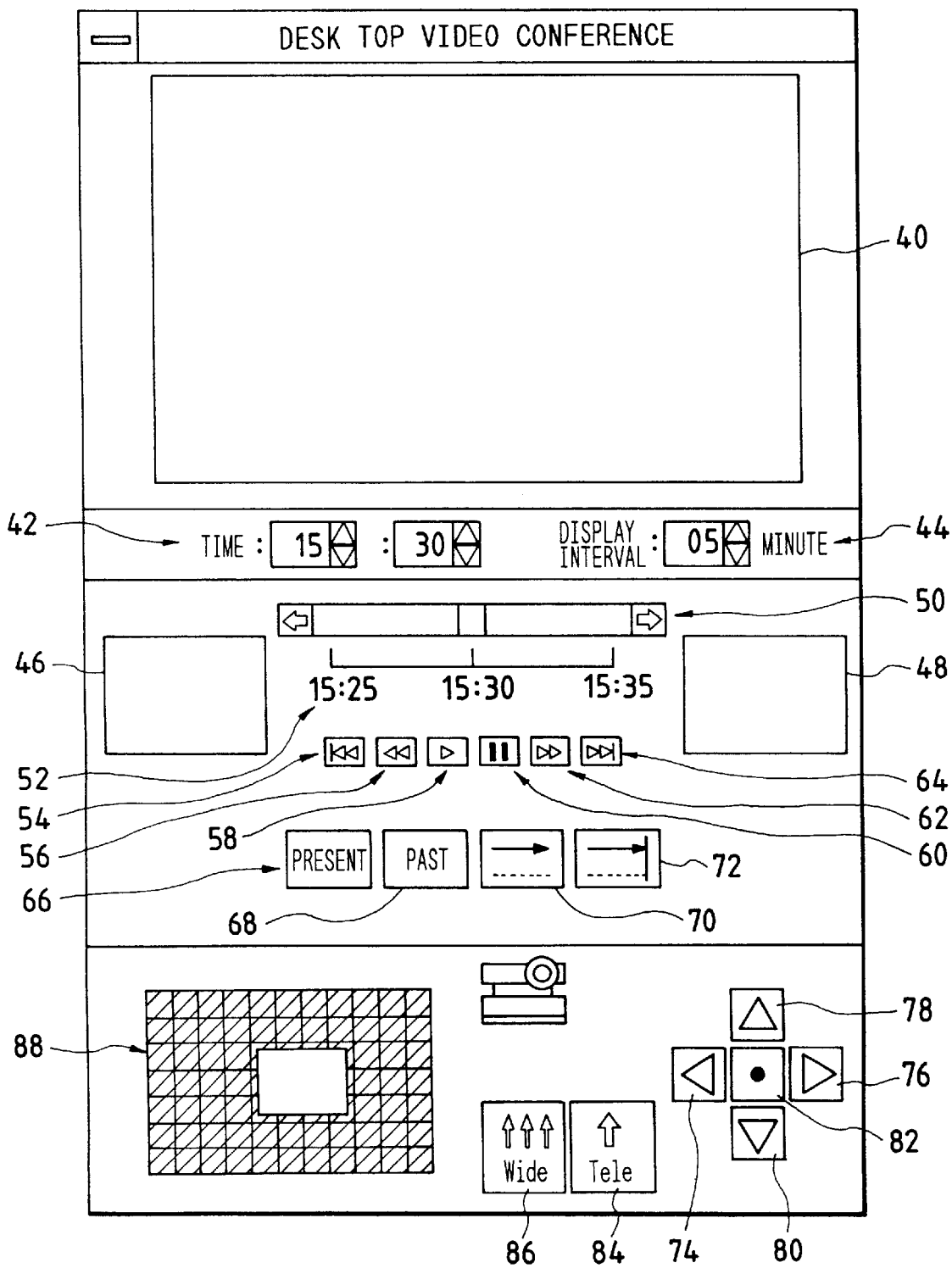
FIG. 7 shows a graphical user interface in the past mode.

FIGS. 6 and 7 show examples of an operator panel and a display screen of a bit map display 26. FIG. 6 shows the screen when the current mode is selected and FIG. 7 shows the screen when the past mode is selected. In both cases, a physical arrangement such as the position of a button is the same.

Referring to FIGS. 6 and 7, a reference number 40 designates the main window for displaying video, a reference number 42 designates a dialog for setting tc in case video is displayed in the main window 40 in the past mode, and a reference number 44 designates a dialog for setting Ts.

A reference number 46 designates a subwindow for displaying a frame at the time tp and a reference number 48 designates a subwindow for setting a frame at the time tf.

A reference number 50 designates a time slider bar for specifying the time between tp and tf of a frame to be displayed in the main window 40 and displaying the frame and the time slider bar is available only when the past mode is selected. A reference number 52 designates a time gauge between tp and tf.

Reference numbers 54, 56, 58, 60, 62 and 64 respectively designate a reproduction control button for controlling video (a dynamic image) between tp and tf displayed in the main window 40. The button 54 is used for specifying processing for subtracting 2Ts from a value of tc, the button 56 is used for specifying processing for rewinding, the button 58 is used for specifying processing for reproduction, the button 60 is used for specifying processing for a pause, the button 62 is used for specifying processing for a rapid traverse and the button 64 is used for specifying processing for adding 2Ts to a value of tc.

A reference number 66 designates a current mode button for setting the current mode and a reference number 68 designates a past mode button for setting the past mode.

A reference number 70 designates a continuous reproduction mode button and a reference number 72 designates an interval reproduction mode button. Continuous reproduction is enabled by pressing the continuous reproduction mode button 70. In this embodiment, a dynamic image can be reproduced only in the interval between tp and tf basically defined based upon tc and Ts, however, if continuous reproduction is enabled, tc is automatically updated when a frame at the time tf is reproduced and reproduction in a new interval is continued. As a result, in the continuous reproduction mode, continuous reproduction without limitation on an interval between tp and tf is enabled. Continuous reproduction can be invalidated by pressing the interval reproduction mode button 72.

Reference numbers 74 to 86 respectively designate a button for operating a camera and a reference number 88 designates a panel for operating a camera. The button 74 is used for specifying a pan to the left side of a camera, the button 76 is used for specifying a pan to the right side, the button 78 is used for specifying an upward tilt, the button 80 is used for specifying a downward tilt and the button 82 is used for specifying an operation for directing a camera to the center. The button 84 is used for specifying operation for increasing the magnifying power of the lens, that is, movement to a telephoto lens and the button 86 is used for specifying operation for reducing the magnifying power of the lens, that is, movement to a wide angle lens. The operator panel 88 shows the direction and the magnifying power of the camera by the position and the size of a four-sided figure in a frame and also displays the current status.

The dialog for setting tc 42, the time slider bar 50, the time gauge 52, the buttons 54 to 64, the current mode button 66, the continuous reproduction mode button 70 and the interval reproduction mode button 72 are enabled only in the past mode. In the meantime, the past mode button 68, the buttons for operating a camera 74 to 86 and the panel for operating a camera 88 are enabled only in the current mode. Disabled objects are displayed in gray out or are not displayed.

In the current mode, a pan, a tilt and zooming of a specified camera can be operated by pressing an appropriate button of the buttons for operating a camera 74 to 86 or operating the panel for operating a camera 88. In a window display system, when a mouse button is clicked at an arbitrary point in a window, the coordinates at that point can be fetched. When an arbitrary point on the screen of the main window 40 is clicked, a camera can be panned or tilted so that the clicked point is in the center using such a function and further, a camera can zoom in or out so that an appropriate range can be photographed. For instance, when an object or a person to be taken notice of is clicked, a camera can be controlled so that the camera is directed in the direction.

In the current mode, a frame at the time tp is displayed in the left subwindow 46. This provides plainness sensible by intuition. CPU 20 controls a bit map display so that a message or a mark showing the system is in the current mode is displayed in the right subwindow 48.

In the past mode, reproduction can be controlled by pressing an appropriate button of the reproduction control buttons 54 to 64 which function as reproduction control buttons provided to a video tape recorder. The buttons 54 and 64 are provided with characteristics peculiar to this embodiment and are used for changing an interval in time specified by the time gauge 52. In FIG. 7, an example in which Ts=5 (min.), tc=three thirty in the afternoon, tp=three twenty-five in the afternoon and tf=three thirty-five in the afternoon is shown, however, when the button 54 is clicked, tc is changed to three twenty in the afternoon, inevitably, tp is changed to three fifteen in the afternoon and tf is changed to three twenty-five in the afternoon. When the button 64 is clicked, tc is changed to three forty in the afternoon. That is, video like that by a movie film is enabled on the three screens of the subwindow 46, the main window 40 and the subwindow 48 by clicking the buttons 54 and 64 many times.

Further, as the interval in time of a frame displayed in the main window 40, the subwindows 46 and 48 can be changed in the dialog 44, a viewer can view at an arbitrary interval in time. This function is very effective in case the system is used for instance as a crime prevention camera system or a monitoring camera system. In case anything is always photographed by a camera, in the case of a video tape, any video recorded on the video tape must be reproduced and displayed by a rapid traverse when change in video is searched, however, according to this embodiment, the video can be accessed without continuation in time and the time required for finding a necessary point can be reduced substantially.

As video at three times can be concurrently seen, change can be readily found. For instance, the system is also effective for a person who is late for a video conference to understand the outline of the entire conference for a short time. Continuous reproduction is enabled by pressing the continuous reproduction mode button 70. Basically, only video between tp and tf is displayed, however, if continuous reproduction is validated, tc is automatically updated when a frame at the time tf is reproduced and reproduction at a new interval is continued. As a result, in the continuous reproduction mode, video is continuously reproduced without limitation on the interval between tp and tf. Continuous reproduction can be invalidated by pressing the interval reproduction mode button 72.

A series of video can be effectively viewed and the operations can be also extremely easy by adopting a graphical user interface as shown in this embodiment.

As readily understandable by the description above, as according to this embodiment a series of video files divided every given time can be continuously handled, a viewer can access video files for a long time without being conscious of each file. By this, really required sections can be readily fetched from massive video data.

Also, as the current video or video at the required time and the past image or the past and future images are concurrently displayed, change in video can be compared on the screens. The change in video is readily sensible and a desired point can be readily found. As the past and future images are displayed as a static image, a circuit for display can be simple and a very effective video display system at a low cost can be provided.

<Second Embodiment>

Referring to the drawings, a second embodiment according to the present invention will be described below.

Figure 8:
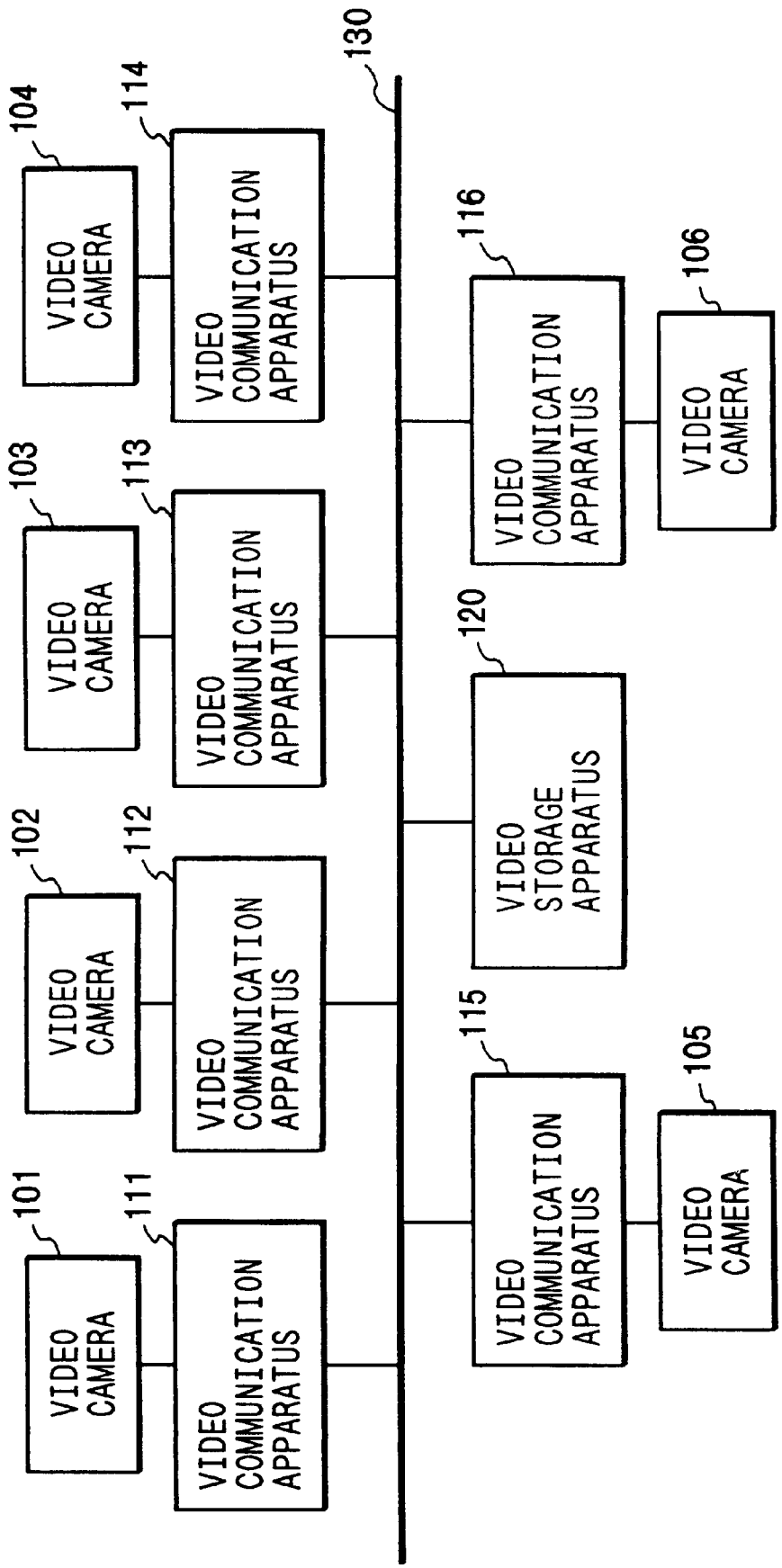
FIG. 8 is a block diagram of a video communication system according to a second embodiment of a present invention.

FIG. 8 is a block diagram showing a video communication system according to this embodiment.

Referring to FIG. 8, reference numbers 101 to 106 respectively designated video camera, reference numbers 111 to 116 respectively designate a video communication device and a reference number 120 designates a video storage apparatus. The video camera 114 is connected respectively to video communication devices 111 to 116.

A reference number 130 designates a network for connecting the video communication devices 111 to 116 and the video storage apparatus 120, and a local area network (LAN) and a wide area network (WAN) such as the telephone network, ISDN and the common carrier leased line are included.

Figure 9:
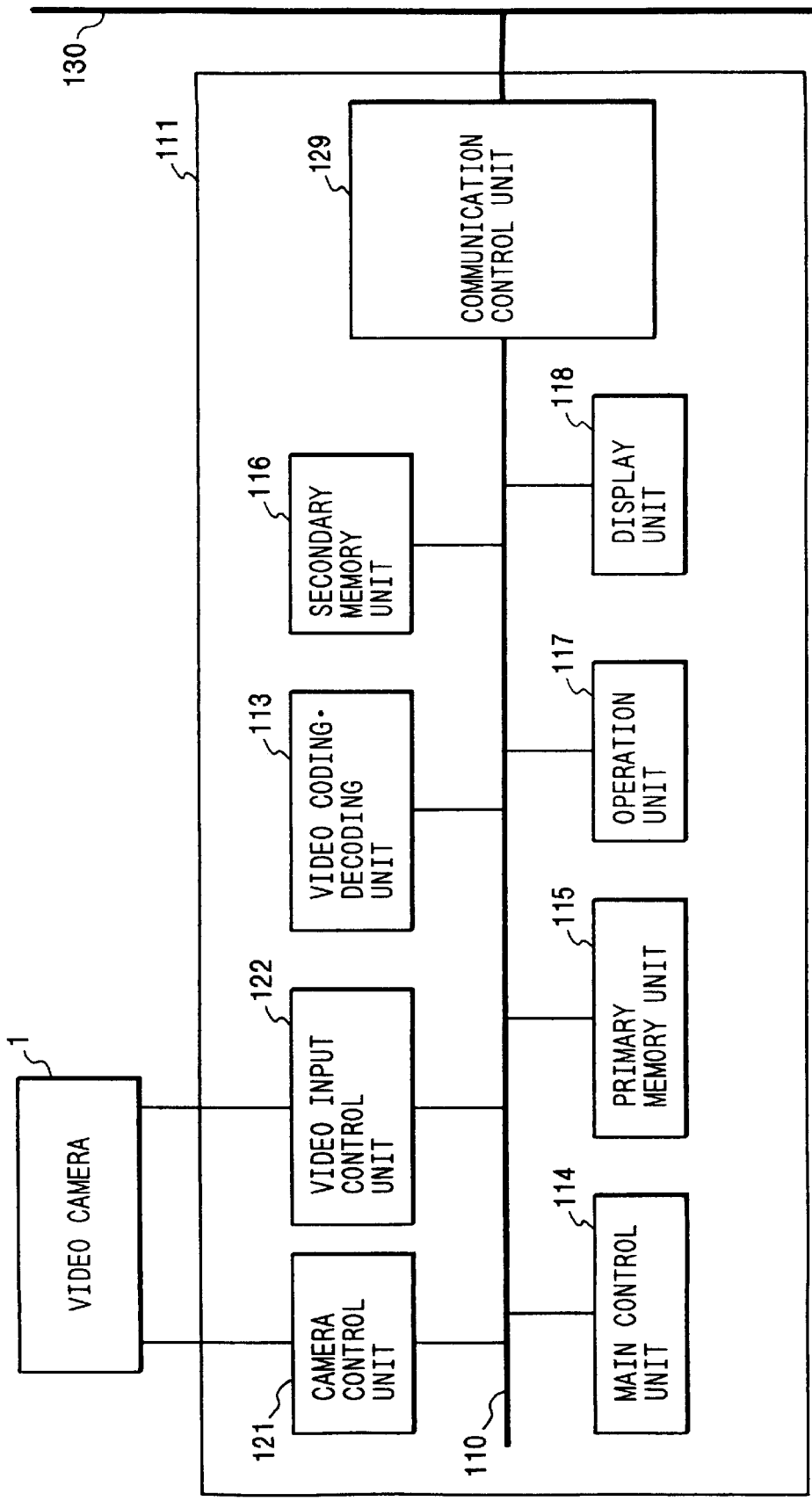
FIG. 9 is a block diagram showing a video communication device according to a second embodiment of the present invention.

FIG. 9 is a block diagram showing video communication devices 111 to 116 according to this embodiment.

Referring to FIG. 9, a reference number 101 designates a video camera, a reference number 100 designates an internal bus and a reference number 121 designates a camera control apparatus for controlling a pan, a tilt and zooming of the camera 101. A reference number 122 designates a video input control apparatus for fetching in the video communication device after a video signal fetched from a video camera is converted from analog to digital, a reference number 113 designates a video encoding/decoding apparatus for compressing or decompressing digital video information, and a reference number 114 designates a main control apparatus for controlling all the video communication devices 111. A reference number 115 designates a primary storage for storing a variety of processing procedures (programs), communication data and control information, and a reference number 116 designates a secondary memory which enables high-speed writing/reading of data. A reference number 117 designates an operation apparatus for a pointing device (mouse), a reference number 118 designates a display apparatus such as a bit map display, and a reference number 129 designates a communication control apparatus for controlling communication with a network 130.

Figure 10:
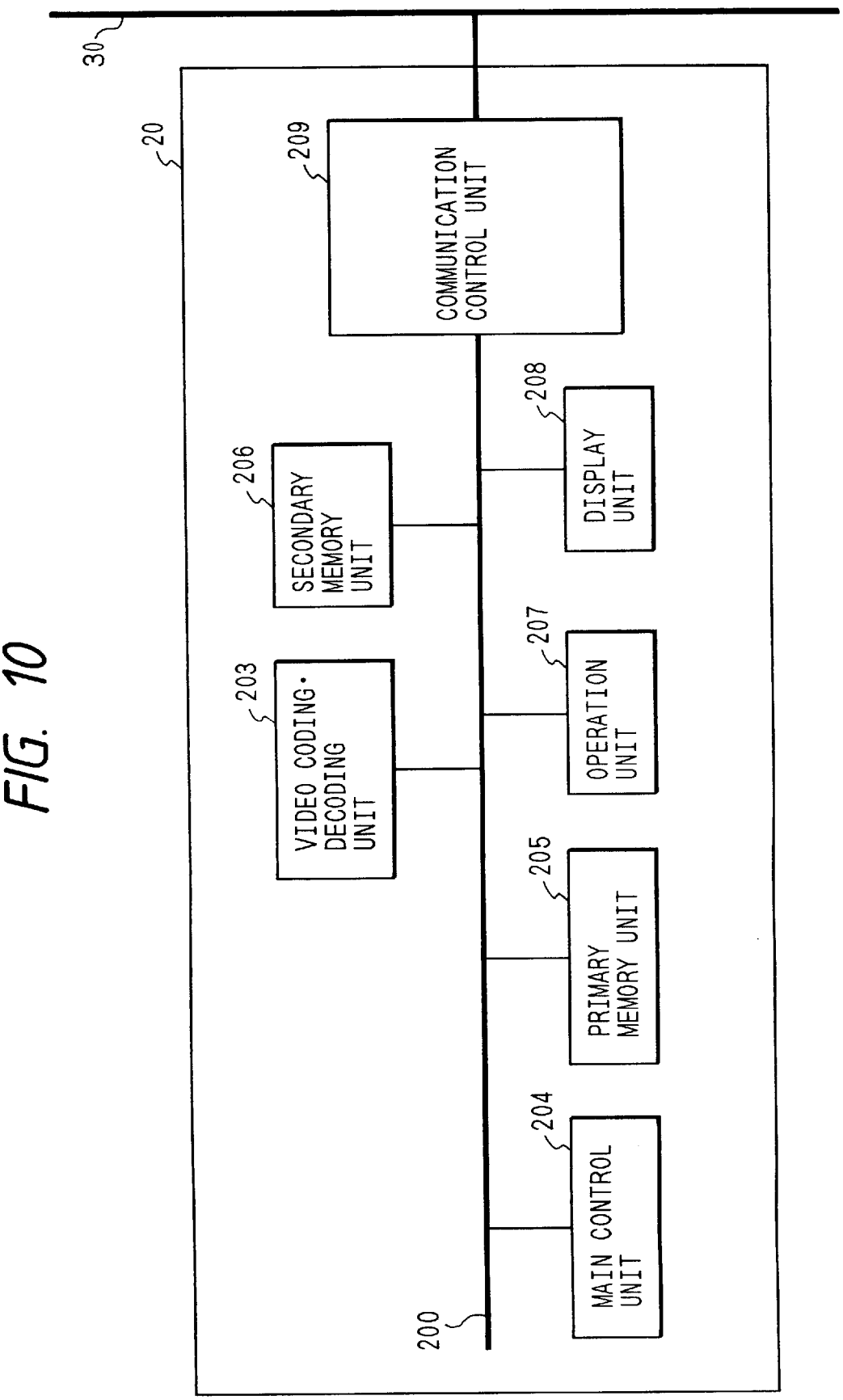
FIG. 10 is a block diagram showing a video storage apparatus shown in FIG. 8 according to a second embodiment of the present invention.

FIG. 10 is a block diagram showing a video storage apparatus 120 according to this embodiment.

Referring to FIG. 10, a reference number 200 designates an internal bus, a reference number 203 designates a video encoding/decoding apparatus (CODEC) for compressing or decompressing digital video information, and a reference number 204 designates a main control apparatus for controlling the entire video storage apparatus 120. A reference number 205 designates a primary storage for storing a variety of processing procedures (programs), communication data and control information, a reference number 206 designates a secondary memory which enables high-speed writing/reading of data, and a reference number 207 designates an operation apparatus for a pointing device (mouse). A reference number 208 designates a display apparatus such as a bit map display and a reference number 209 designates a communication control apparatus for controlling communication with a network 130.

Figure 11:
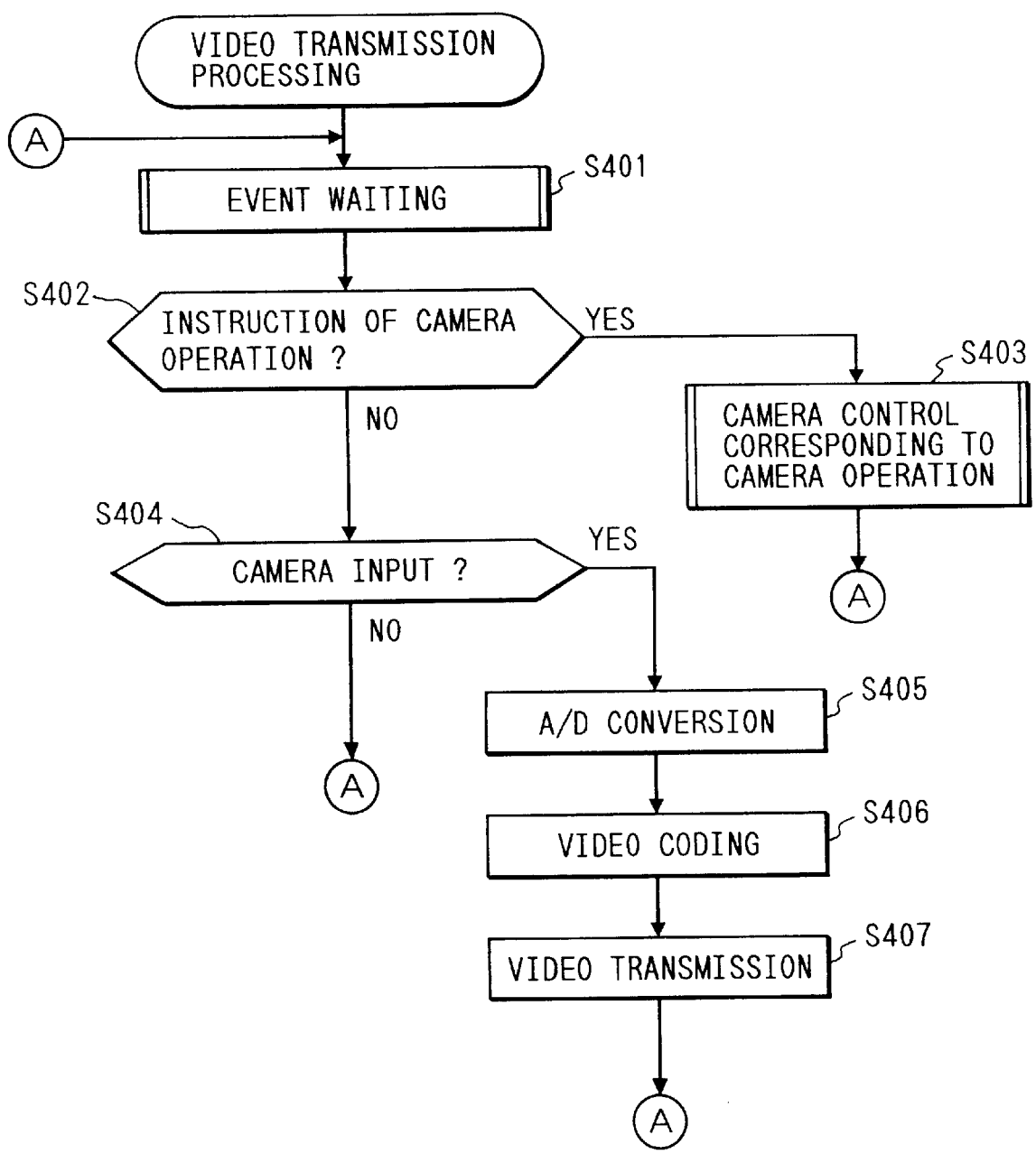
FIG. 11 is a flowchart showing operation in video transmission processing by a video communication device shown in FIG. 9 according to a second embodiment of the present invention.
Figure 12:
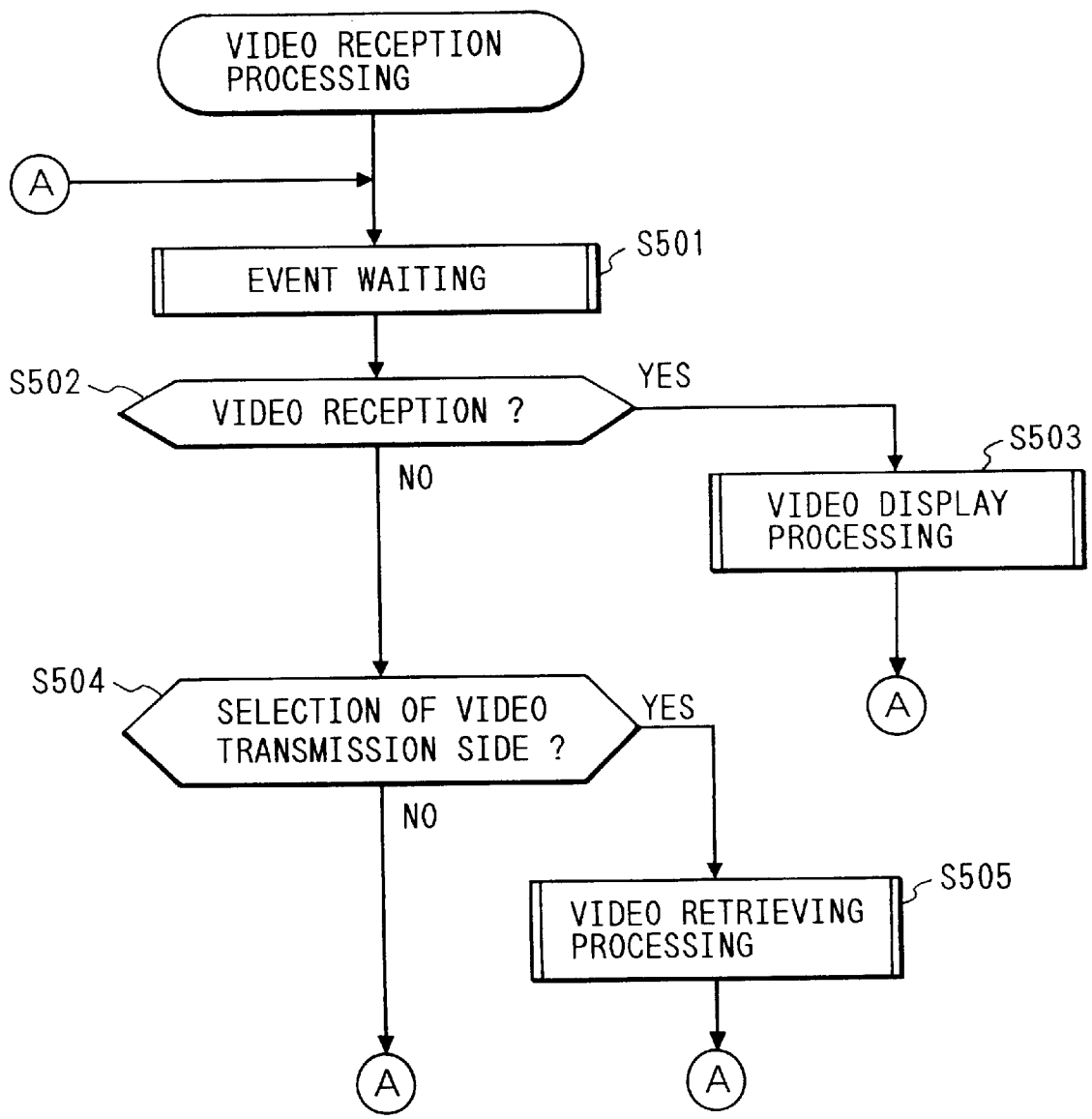
FIG. 12 is a flowchart showing operation in video receiving processing by a video communication device according to a second embodiment of the present invention.
Figure 13:
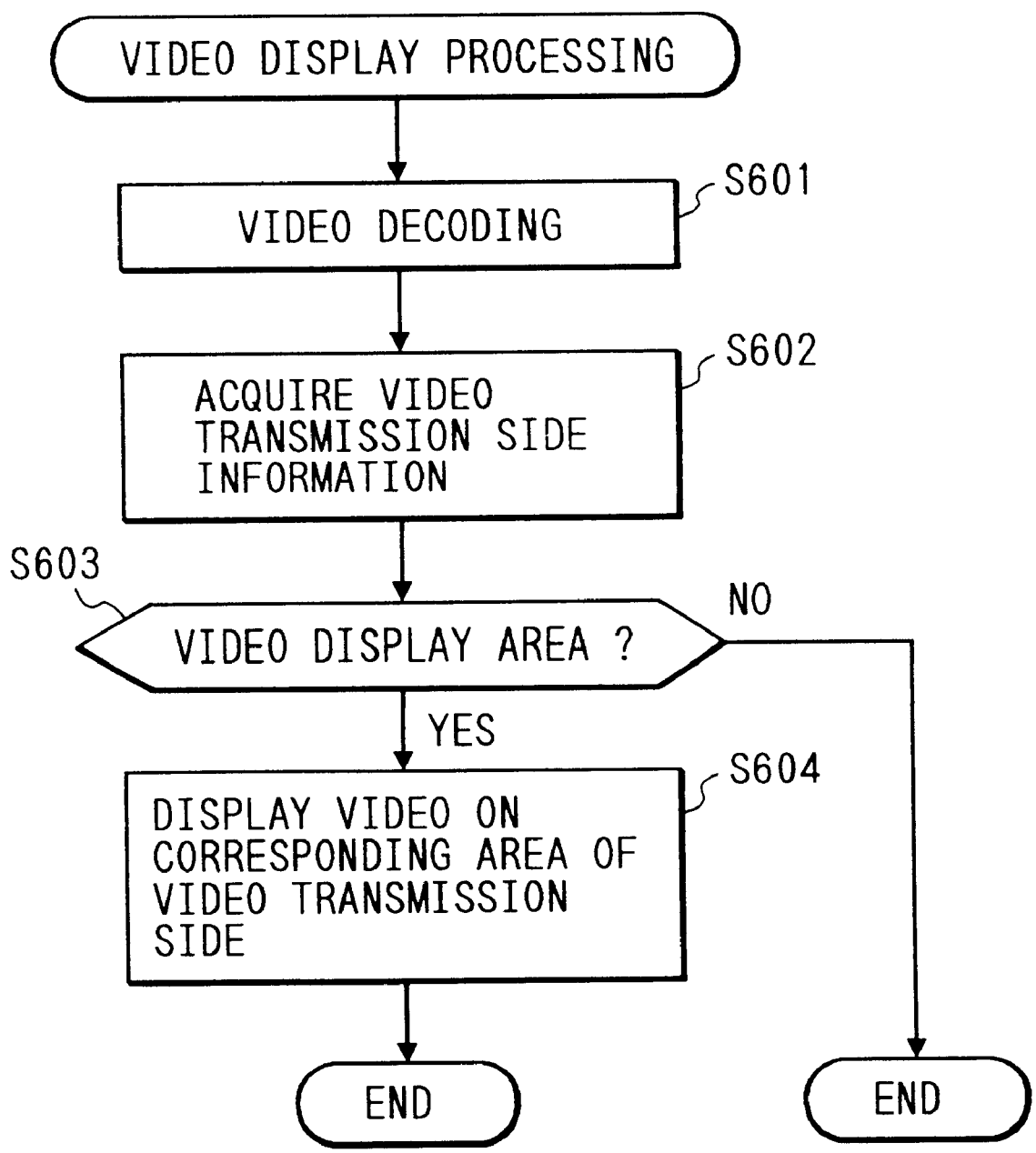
FIG. 13 is a flowchart showing operation in video display processing by a video communication device according to a second embodiment of the present invention.

FIGS. 11 to 13 are flowcharts showing operation of the video communication devices 111 to 116 according to this embodiment.

Figure 14:
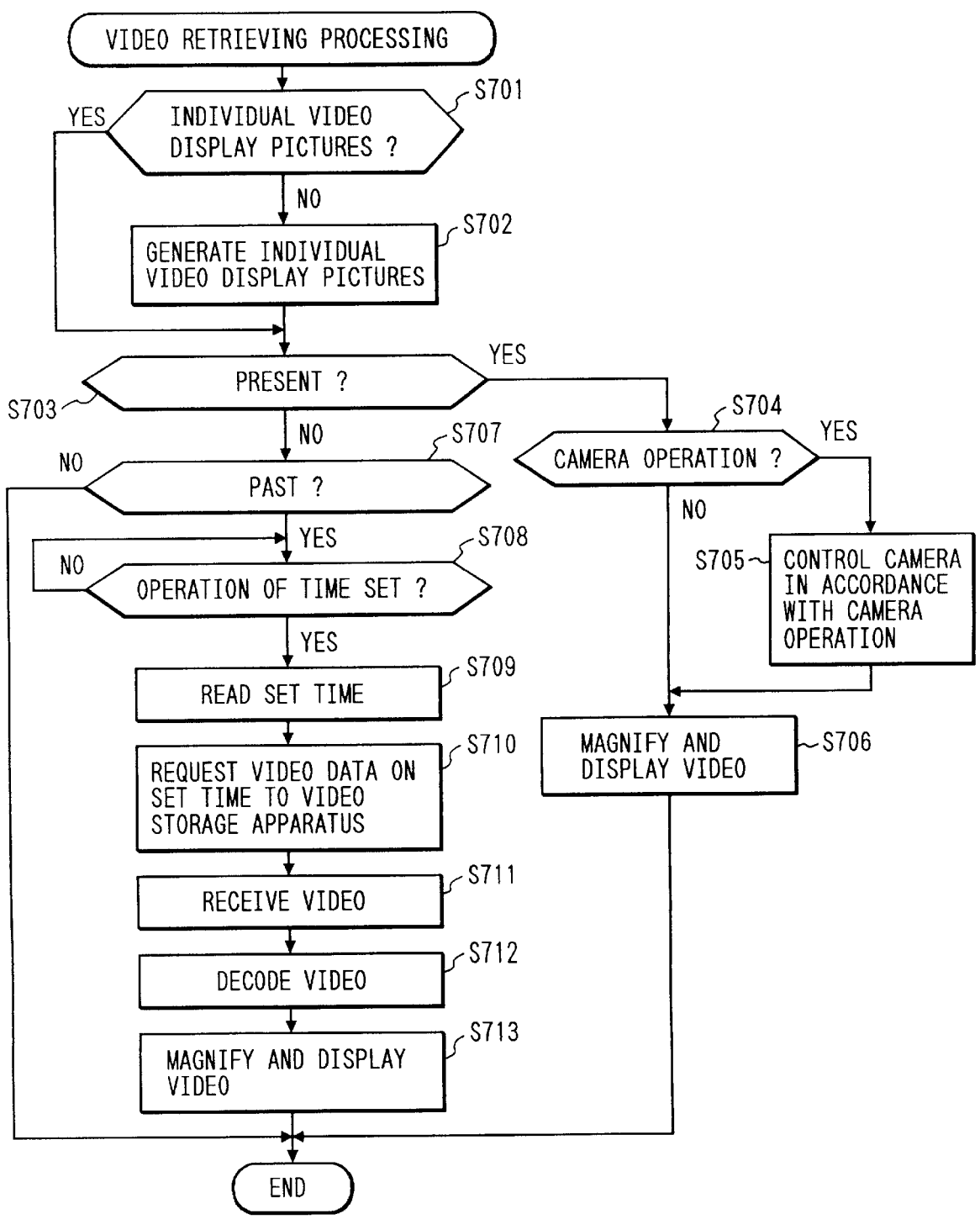
FIG. 14 is a flowchart showing operation in video retrieval processing by a video storage apparatus according to a second embodiment of the present invention.
Figure 15:
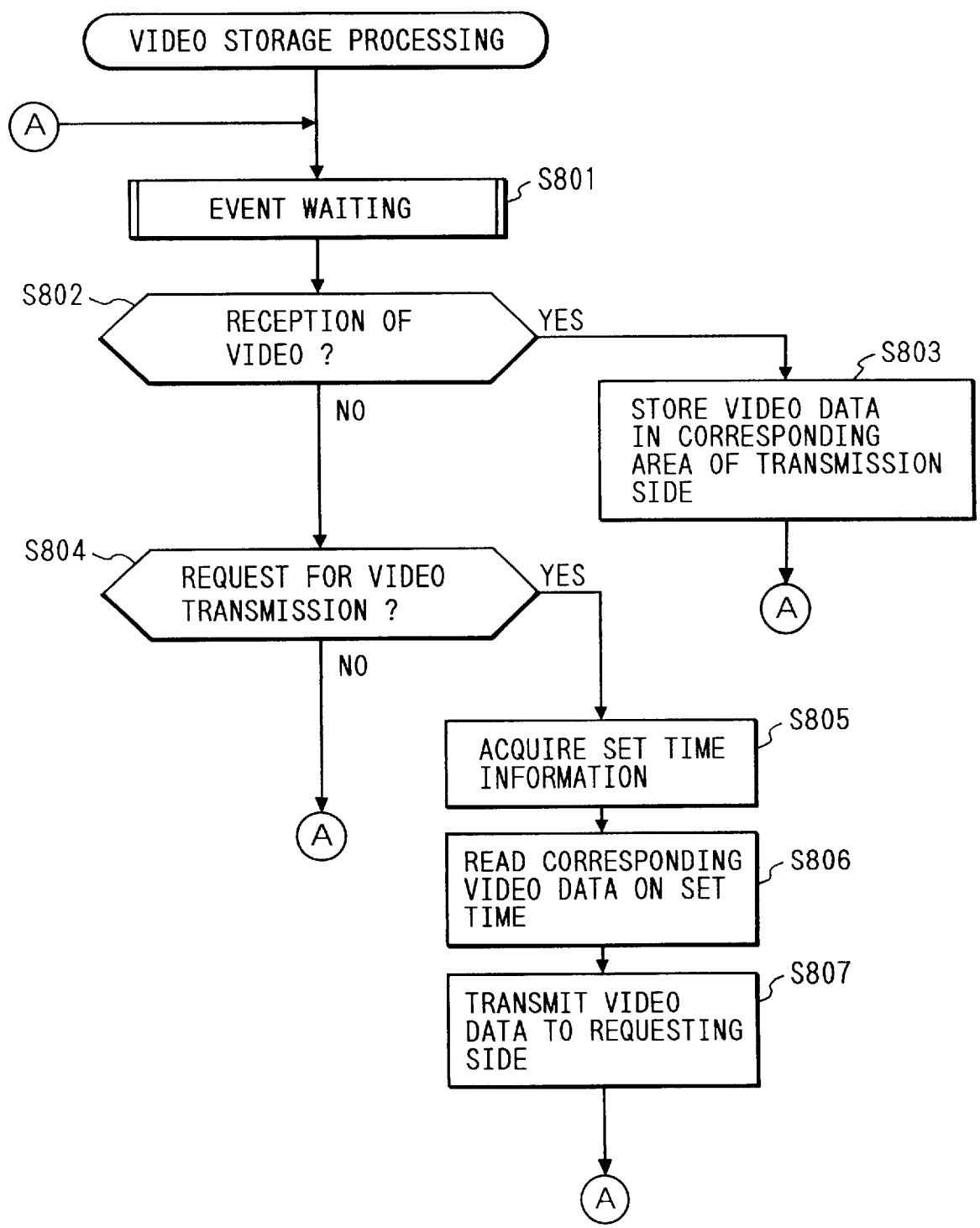
FIG. 15 is a flowchart showing operation in video storage processing by a video storage apparatus according to a second embodiment of the present invention.

FIGS. 14 and 15 are flowcharts showing operation of the video storage apparatus 120 according to this embodiment.

Figure 16:
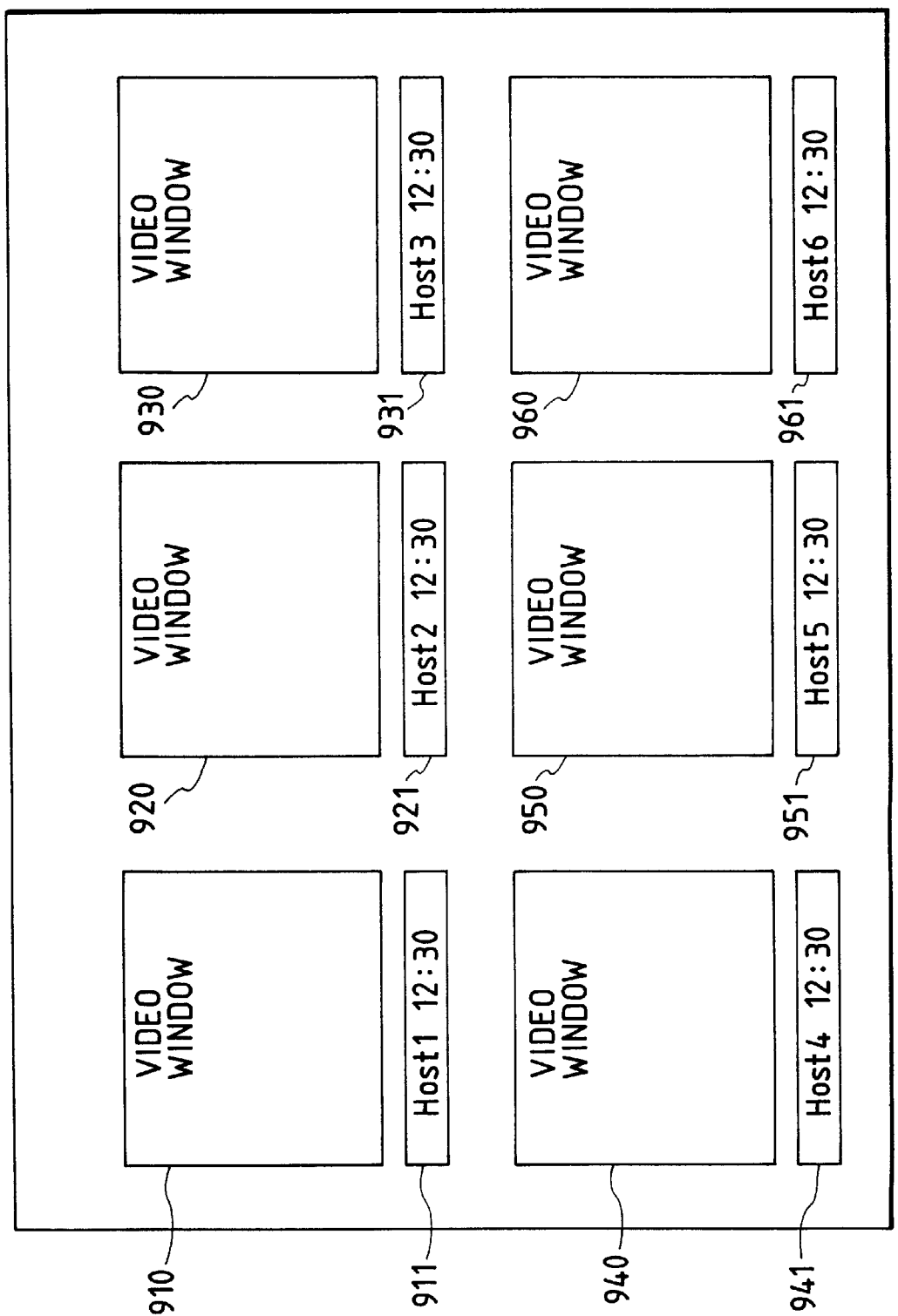
FIG. 16 shows an example of an entire video display screen by a video communication device according to a second embodiment of the present invention.

FIG. 16 shows an example of the screen displaying the entire display apparatus 118 of the video communication devices 111 to 116 according to this embodiment. Each video communication device 111 to 116 according to this embodiment is a terminal used for, for instance a video conference or a visual telephone and video windows 910 to 960 corresponding to each participant of a video conference are shown in FIG. 16.

Referring to FIG. 16, reference numbers 910 to 960 designate video windows for receiving and displaying video transmitted by the video communication devices 111 to 116 to which video cameras 101 to 106 are connected, and reference numbers 911 to 961 respectively designate a status for displaying the name of a calling party and the time in which video is input corresponding to each video window 910 to 960.

Figure 17:
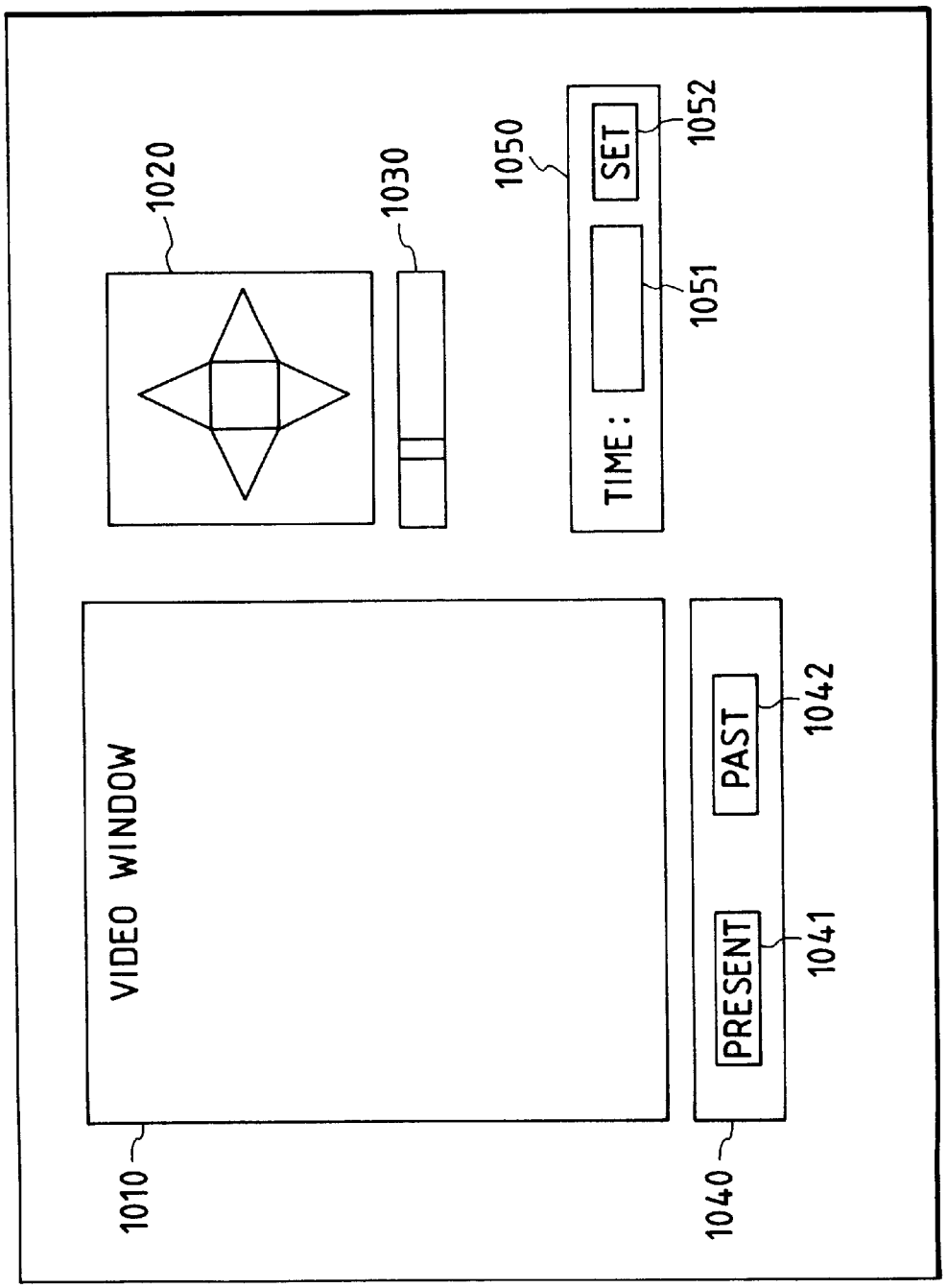
FIG. 17 shows an example of an individual video display screen by a video communication device according to a second embodiment of the present invention.

FIG. 17 shows an example of the screen for displaying individual video in a display section 118 of the video communication devices 111 to 116 according to this embodiment.

Referring to FIG. 17, a reference number 1010 designates a video window for receiving and displaying video transmitted by the specified one of the video communication devices 111 to 114. Reference numbers 1020 and 1030 designate camera control panels for controlling the video cameras 101 to 104 via a camera control apparatus 111 and they issue an instruction to the camera control apparatus 111 by clicking a variety of graphical user interfaces (GUI) via a mouse to enable a pan, a tilt (1020) and zooming (1030) of a camera.

A reference number 1050 designates a time specification panel for inputting a time and when a time is input to a time input field 1051 and a setting button 1052 is clicked, dynamic image data stored in the video storage apparatus 120 is accessed to retrieve data corresponding to the specified time.

A reference number 1040 designates a switch for switching video from the video communication devices 111 to 114 and reading dynamic image data stored in the video storage apparatus 120, and when the current mode button 1041 is clicked, video transmitted by the video communication devices 111 to 114 is displayed in a dynamic image display window 1010. When the past mode button 1042 is clicked, dynamic image data stored in the video storage apparatus 120 is read and displayed in the dynamic image display window 1010. When a time is input to a time specification panel 1050 and a setting button 1052 is clicked, dynamic image data stored in the video storage apparatus 20 is retrieved and displayed.

FIG. 18 shows an example of a data format used for the video communication system according to this embodiment and the format is constituted by a header comprising fields 141 to 145 and data 146.

The header 141 to 145 comprises a packet type field 141 for specifying a variety of communication commands, a calling party's name field 142 for writing the name of a calling party, a called party's name field 143 for writing the name of a called party, a media type field 144 for writing a media type of a character, a static image, voice and a dynamic image and the other field 145 for writing the other additional information. All media which may be handled as digital data may be written to the data field 146.

The details of video transmission processing in the video communication device 111 constituted as described above according to this embodiment will be described below based upon a flowchart shown in FIG. 11. However, as described above, the video communication device 111 executes the following processing according to a mail processing program stored in a primary storage 115 under control by a main control apparatus 114.

First, in a step S401, generation of an event is awaited. When an event is generated, processing proceeds to a step S402 and in the step, it is checked whether the type of the event is an instruction for operating a camera or not. If the type of the event is an instruction for operating a camera, processing proceeds to a step S403 and in the step, video cameras 101 to 104 are controlled via a camera control apparatus 111.

A command for operating a camera comprises tilt (θ), pan (φ), zoom (z) ... (1) and according to these commands, a tilt, a pan and zooming of a camera are controlled.

These commands are allocated to camera control panels 1020 and 1030 shown in FIG. 17. While an upward/downward button in the camera control panel 1020 is pressed, a tilt (θ) command is called increasing/decreasing an angle θ. Similarly, while a left-hand/right-hand button in the camera control panel 1020 is pressed, a pan (φ) command is called increasing/decreasing an angle φ. When a scroll bar in the camera control panel 1030 is operated, a zoom (z) command is called increasing/decreasing the magnifying power z of zooming.

However, operations of a camera may be instructed by the local video communication device or by the remote video communication device.

In the step S402, if the type of an event is not an instruction for operating a camera, processing proceeds to a step S404 and in the step, it is checked whether there is an input to a camera or not. If the video camera 101 connected to the video communication device 111 is normally operated, processing proceeds to the step S404 and in the step, a video signal fetched by a video input control apparatus 112 is converted from analog to digital.

Next, processing proceeds to a step S406 and in the step, digital video data is compressed by video CODEC 113, processing proceeds to a step S407 and after a communication data format described later is generated, the compressed digital video data is transmitted to the network 130 via a communication control apparatus 119. In this case, communication data is required to comply with the format shown in FIG. 18, a code showing "transmission of video" is written to the packet type field 141, the name of the video communication device 111 is written to the calling party's name filed 142, the name of the other video communication devices 112 to 116 or the video storage apparatus 120 is written to the called party's name field 143, a code showing "a dynamic image" is written to the media type field 144, the time in which video is fetched is written to the other field 145 and digitized video data is written to the data field 146.

For the above-described name of a called party, "a broadcast address" by which any device in a network can be specified may be used. Further, if necessary, "a multicast address" by which a specific plural devices can be specified or "a unicast address" by which a specific device can be specified may be used.

By the above-described processing, video information is transmitted at a real time form each video communication device 111 to 114 to the network 130.

Next, the details of video receiving processing by a video communication device.115 according to this embodiment will be described below based upon a flowchart shown in FIG. 12.

First, in a step S501, generation of an event is awaited. When an event is generated, processing proceeds to a step S502 and in the step, it is checked whether the type of the event is reception of video or not.

If communication data shown in FIG. 18 is received from the network 130 via the communication control apparatus 119 shown in FIG. 9, the packet type field 141 is checked, if a code showing "transmission of video" is identified, processing proceeds to a step S503, in the step, the entire video display processing shown in an example of the screen in FIG. 16 is performed and processing is returned to the step S501. If the name in the called party's name field 104 does not show the local video communication device, the received data is discarded.

If the type of an event is not reception of video in the step S502, processing proceeds to a step S504 and in the step, it is checked whether a specific calling party of video is selected or not. Operations for selecting a specific calling party of video is performed by clicking an arbitrary one video window of video windows 910 to 960 shown in FIG. 16. If a specific calling party of video, for instance one of the windows 910 to 960 shown in FIG. 16 is selected in the step S504 by the operation apparatus 117 shown in FIG. 9, processing proceeds to a step S505 and in the step, video retrieval processing described later is performed and processing is returned to the step S501.

Next, referring to a flowchart shown in FIG. 13, the details of video display processing by a video communication device 115 according to this embodiment will be described.

If video data is received in the step S502 shown in FIG. 12, the following the entire video display processing shown in FIG. 13 is performed. First, in a step S601, a data field 146 of received video data is read and digital video data is decompressed by video CODEC 113. Next, processing proceeds to a step S602 and in the step, a calling party's name field 142 is read to identify the calling party of video. Further, processing proceeds to a step S603 and in the step, it is checked whether video windows 910 to 960 on the display screen shown in FIG. 16 are empty or not. If they are empty, processing proceeds to a step S604 and in the step, received video data is displayed in a video window corresponding to a calling party of video. Concurrently, the time in which video is fetched from the other field 45 is read and the time is displayed together with the name of a calling party in any of statuses 911 to 961.

If a plurality of calling parties of video exist in the network 130, received video data is displayed in a video window corresponding to the name of a calling party obtained in the step S602.

In the meantime, if seven terminals or more of calling parties of video exist in the network 130, video signals for six terminals are already received and a video signal is transmitted from the seventh terminal, in the step S603 processing is terminated without proceeding to the step S604 because data is stored in all the video windows on the display screen shown in FIG. 16.

In this embodiment, six video windows are provided, however, seven video windows or more, or six video windows or less may be provided. In a word, the number of video windows may be changed depending upon that of calling parties of video in a network.

In such a case, the number of calling parties of video concurrently displayed may be increased by creating a new screen with more video windows.

By the above-described processing, video transmitted from the video communication devices 111 to 114 to the network 130 can be received and displayed at a real time.

Next, referring to a flowchart shown in FIG. 14, the details of video retrieval processing by the video communication device 115 according to this embodiment will be described below.

If a specific calling party of video is selected in a step S504 shown in FIG. 12, the following individual video display processing shown in FIG. 14 is performed.

First, in a step S701, it is checked whether an individual video display screen shown in FIG. 17 is generated in a display apparatus 208 of the video communication device 115 or not. If an individual video display screen is not generated, processing proceeds to a step S702 and in the step, an individual video display screen shown in FIG. 17 is generated. Next, in a step S703, it is checked whether the current mode button 1041 shown in FIG. 17 is selected or not. If the current mode button 1041 is selected, processing proceeds to a step S704 and in the step, it is checked whether an instruction for operating a camera is issued in the camera control panels 1020 and 1030 or not. If an instruction for operating a camera is issued, processing proceeds to a step S705 and in the step, control over a camera corresponding to an instruction for operating a camera is applied to a calling party of video. In the concrete, camera control information according to a format shown in FIG. 18 is transmitted to a calling party of video, for instance video communication devices 111 to 114 shown in FIG. 8. In the concrete, a code showing "control over a camera" is written to the packet type field 141, the name of the local video communication device 115 is written to the calling party's name field 142, the name of a calling party obtained in the step S602 shown in FIG. 13 is written to a called party's name field 143, a code showing "control data" is written to the media type field 144, a camera control command is written to the other field 145, and communication data to which additional information of the camera control command is written is generated in the data field 146 and is transmitted to the network 130 via the communication control apparatus 119.

Next, processing proceeds to a step S706 and in the step, magnified received video is displayed in a video window 1010 shown in FIG. 17 and processing is terminated. As the individual video window 1010 shown in FIG. 17 is larger than the entire video windows 910 to 960 shown in FIG. 16, magnified video can be displayed.

In the meantime, in a step S707, if it is detected that the past mode button 1042 shown in FIG. 17 is selected, processing proceeds to a step S708 and in the step, the following processing for retrieving and displaying the past image is performed. In the step S708, completion of the operation for setting the time at which video is input is awaited. When the time is input to the time input field 1051 in the time specification panel 1050 shown in FIG. 17 and it is detected that the setting button 1052 is clicked, processing proceeds to a step S709 and in the step, the time input to the time input field 1051 is read.

Next, processing proceeds to a step S710 and in the step, video data corresponding to the set time is required to the video storage apparatus 120 shown in FIG. 8. In the concrete, a code showing "video data required" is written to the packet type field 141 according to a format shown in FIG. 18, the name of the local video communication device 115 is written to a calling party's name field 142, the name of the video storage apparatus 120 is written to a called party's name field 143, a code showing "control data" is written to the media type field 144, and communication data to which the set time is written is generated in the other field 145 and is transmitted to the network 130 via the communication control apparatus 119.

The video storage apparatus 120 receives data according to a format shown in FIG. 8 and transmits required video data.

Next, processing proceeds to a step S711 and in the step, video data transmitted by the video storage apparatus 120 is received from the network 130 via the communication control apparatus 119. In the next step S712, the data field 146 in received video data is read and digital video data is decompressed by video CODEC 113. Further, processing proceeds to a step S713 and in the step, received video data is magnified in adjustment with the size of the video window 1010 on the individual video display screen shown in FIG. 17 and is displayed in the video window 1010.

Next, if displayed video is to be changed, the flow of processing shown in a flowchart in FIG. 12 is executed by turning on switches, flow shown in FIG. 14 is again executed and displayed video is changed.

By the above-described processing, the past video of video fetched from a remote video camera can be continuously retrieved based upon the current video and displayed.

Next, referring to a flowchart shown in FIG. 15, the details of video storage processing by the video storage apparatus 120 according to this embodiment will be described.

First, in a step S801, generation of an event is awaited. If an event is generated, processing proceeds to a step S802 and in the step, it is checked whether the type of the event is reception of video or not. If the packet type field 141 is checked and a code showing "transmission of video" is identified when communication data shown in FIG. 18 is received from the network 130 via the communication control apparatus 209 shown in FIG. 10, processing proceeds to a step S803 and in the step, video data storage processing described below is performed. In the step S803, data in a calling party's name field 142 is read to identify the calling party of video.

Next, data in the other field 145 is read to obtain time information comprising video. Video data written to the data field 146 is read and the video data is stored in an area in the secondary memory 206 corresponding to the calling party of the video together with the time information. If the name stored in a called party's name field 143 does not show the local video storage apparatus, the received data is discarded.

In the meantime, in the step S802, if the type of an event is not reception of video, processing proceeds to a step S804 and in the step, it is checked whether video data is required by video communication devices 111 to 116 or not. If communication data including a code showing "video data required" is received from the network 130 via the communication control apparatus 209 shown in FIG. 10 and is written to the packet type field 141, processing proceeds to a step S805 and in the step, the name of a requiring video communication device written to a calling party's name field 142 and time information set in the other field 145 are obtained. Next, processing proceeds to a step S806, in the step, data is retrieved using the name of the requiring video communication device and the set time information as a key and desired video data is read from the secondary memory 206 shown in FIG. 10. Next, processing proceeds to a step S807 and in the step, after a communication data format described later is generated, it is transmitted to the network 130 via the communication control apparatus 209.

In this case, the communication data complies with a format shown in FIG. 11, a code showing "transmission of video" is written to the packet type field 141, the name of the video storage apparatus 120 is written to a calling party's name field 142, the name of the requiring video communication device is written to a called party's name field 143, a code showing "a dynamic image" is written to the media type field 144, time information is written to the other field 145 and video data is written to the data field 146.

By the above-described processing, the past images required by video communication devices 111 to 116 can be transmitted to the network 130.

The present invention may be applied to a system constituted by a plurality of devices or may be applied to a system comprising one device. The number of video communication devices is not limited to six.

Also, naturally, the present invention can be applied to a system or a device on which a program is running.

According to this embodiment as described above, as a system or an information communication device to which a storage and a plurality of information communication devices are connected via a network is provided with a transmission means for transmitting request data for requiring either image data of an image input to another different from the above-described information communication device or an image at an arbitrary time stored in the above-described storage, and a receiving means for receiving transmission data transmitted in response to the above-described request data by the above-described another information communication device or the above-described storage, the current video provided by another information communication device and an image formerly obtained can be continuously retrieved and displayed on the system.

What is claimed is:

1. An image processing apparatus for reading data from a file in which dynamic image data is stored, comprising:

instructing means for instructing a timing for reading dynamic image data;

first reading means for reading said dynamic image data from said file at a first timing which is arbitrarily selected by a user; and second reading means for reading said dynamic image data at predetermined timings prior to and later than the first timing of reading by said first reading means, in parallel with said first reading means, for viewing plural images that are read out in parallel but at different timings from each other, wherein first dynamic image data read by said first reading means and second dynamic image data read by said second reading means are displayed time-sequentially on a common display.

2. An image processing apparatus according to claim 1, further comprising display means for displaying dynamic image data read by said first reading means and said second reading means.

3. An image processing apparatus according to claim 1, further comprising said file in which said dynamic image data is stored.

4. An image processing apparatus according to claim 1, wherein said dynamic image data read by said second reading means is static image data.

5. An image processing apparatus according to claim 1, wherein said dynamic image data read by said second reading means is data prior by a predetermined time of said dynamic image data read by said first reading means.

6. An image processing apparatus according to claim 5, wherein said instruction means sets the predetermined time.

7. An apparatus according to claim 1, wherein the amount of dynamic image data read by said second reading means is less than the amount of dynamic image data read by said first reading means.

8. An apparatus according to claim 1, wherein the dynamic image data that is read by said second reading means has a frame rate that is lower than that of the dynamic image data read by said first reading means.

* * * * *

UNITED STATES PATENT AND TRADEMARK OFFICE
CERTIFICATE OF CORRECTION

PATENT NO.    : 6,297,856 B1
DATED         : October 2, 2001
INVENTOR(S)   : Yasuo Nakamura et al.

It is certified that error appears in the above-identified patent and that said Letters Patent is hereby corrected as shown below:

<u>Column 4,</u>
Line 52, "can be also" should read -- also can be --.

<u>Column 6,</u>
Line 60, "can be also" should read -- also can be --.

<u>Column 7,</u>
Line 15, "designated" should read -- designate a --.

<u>Column 9,</u>
Line 58, "a" should be deleted; and
Line 62, "form" should read -- from --.

<u>Column 10,</u>
Line 31, "the" (second occurrence) should be deleted.

<u>Column 14,</u>
Lines 18-20, claim 4 should be deleted.

Signed and Sealed this

Twenty-fifth Day of June, 2002

Attest:

Attesting Officer

JAMES E. ROGAN
Director of the United States Patent and Trademark Office